(12) United States Patent
Wilder et al.

(10) Patent No.: US 10,503,345 B2
(45) Date of Patent: *Dec. 10, 2019

(54) SIMPLIFIED CALENDAR EVENT CREATION

(71) Applicant: START PROJECT, LLC, Corte Madera, CA (US)

(72) Inventors: Nicholas Wilder, Boulder, CO (US); Narendra Rocherolle, Mill Valley, CA (US); Julie Davidson Rocherolle, Mill Valley, CA (US)

(73) Assignee: START PROJECT, LLC, Corte Madera, CA (US)

( * ) Notice: Subject to any disclaimer, the term of this patent is extended or adjusted under 35 U.S.C. 154(b) by 713 days.

This patent is subject to a terminal disclaimer.

(21) Appl. No.: 15/069,676

(22) Filed: Mar. 14, 2016

(65) Prior Publication Data

US 2016/0196012 A1 Jul. 7, 2016

Related U.S. Application Data

(63) Continuation of application No. 12/011,314, filed on Jan. 25, 2008, now Pat. No. 9,286,935.

(Continued)

(51) Int. Cl.
*G06F 3/048* (2013.01)
*G06F 3/0481* (2013.01)
*G11B 20/12* (2006.01)
*G06Q 10/10* (2012.01)
*G06F 17/27* (2006.01)
*G06F 3/0484* (2013.01)
*G06F 17/22* (2006.01)
*G06F 17/24* (2006.01)

(52) U.S. Cl.
CPC ........ *G06F 3/0481* (2013.01); *G06F 3/04842* (2013.01); *G06F 3/04847* (2013.01); *G06F 17/2235* (2013.01); *G06F 17/24* (2013.01); *G06F 17/271* (2013.01); *G06F 17/277* (2013.01); *G06Q 10/10* (2013.01); *G11B 20/1217* (2013.01)

(58) Field of Classification Search
None
See application file for complete search history.

(56) References Cited

U.S. PATENT DOCUMENTS 6,047,259 A * 4/2000 Campbell ............. G06F 19/325
705/3
6,262,735 B1 * 7/2001 Etelapera ............. G06F 3/0489
715/854

(Continued)

*Primary Examiner* — Scott T Baderman
*Assistant Examiner* — Haimei Jiang
(74) *Attorney, Agent, or Firm* — North Weber & Baugh LLP

(57) ABSTRACT

Disclosed are embodiments of systems and methods that allow for simplified creation of a calendar event. In embodiments, an entry may be provided via a simplified entry form. In embodiments, the present invention simplifies the creation of an event through natural language parsing. Embodiments may enable creation of an event for a calendaring application and/or within an application that is not primarily a calendaring application, such as, by way of example, an email application, an SMS/text messaging application, an instant messaging (IM) application, and a social networking application.

20 Claims, 15 Drawing Sheets

Related U.S. Application Data

(60) Provisional application No. 60/887,140, filed on Jan. 29, 2007, provisional application No. 60/887,797, filed on Feb. 1, 2007, provisional application No. 60/888,073, filed on Feb. 2, 2007.

(56) References Cited

U.S. PATENT DOCUMENTS

| | | | | |
|---|---|---|---|---|
| 7,146,381 | B1* | 12/2006 | Allen | G06F 17/2705 |
| 7,370,282 | B2* | 5/2008 | Cary | G06Q 10/109 |
| | | | | 715/772 |
| 7,421,660 | B2* | 9/2008 | Charnock | G06F 17/30713 |
| | | | | 707/999.003 |
| 7,571,108 | B1* | 8/2009 | Leban | G06Q 10/06311 |
| | | | | 705/7.13 |
| 7,747,639 | B2* | 6/2010 | Kasperski | G06F 17/30864 |
| | | | | 707/765 |
| 8,713,418 | B2* | 4/2014 | King | G06F 17/30011 |
| | | | | 715/200 |
| 2001/0013043 | A1* | 8/2001 | Wagner | G06F 17/272 |
| | | | | 715/229 |
| 2001/0014859 | A1* | 8/2001 | Itoh | G10L 15/197 |
| | | | | 704/240 |
| 2002/0044687 | A1* | 4/2002 | Federman | G06F 17/243 |
| | | | | 382/187 |
| 2002/0193995 | A1* | 12/2002 | Case | G10L 13/06 |
| | | | | 704/260 |
| 2004/0103367 | A1* | 5/2004 | Riss | G06F 17/2264 |
| | | | | 715/223 |
| 2005/0076037 | A1* | 4/2005 | Shen | G06Q 10/107 |
| 2005/0108267 | A1* | 5/2005 | Gibson | G06F 17/30569 |
| 2005/0246316 | A1* | 11/2005 | Lawson | G06F 19/707 |
| 2006/0047632 | A1* | 3/2006 | Zhang | G06F 17/30734 |
| 2007/0055656 | A1* | 3/2007 | Tunstall-Pedoe | G06F 17/30654 |
| 2007/0083552 | A1* | 4/2007 | Allen | G06F 17/2705 |
| 2007/0219773 | A1* | 9/2007 | Roux | G06F 17/27 |
| | | | | 704/1 |
| 2007/0220063 | A1* | 9/2007 | O'Farrell | G06F 17/277 |
| 2007/0282595 | A1* | 12/2007 | Tunning | G06F 3/0481 |
| | | | | 704/9 |
| 2008/0027893 | A1* | 1/2008 | Cavestro | G06F 17/30014 |
| 2008/0077888 | A1* | 3/2008 | Miksovsky | G06Q 10/109 |
| | | | | 368/29 |
| 2008/0140384 | A1* | 6/2008 | Landau | G06F 17/27 |
| | | | | 704/9 |
| 2009/0319295 | A1* | 12/2009 | Kass-Hout | G06F 19/3493 |
| | | | | 705/2 |

* cited by examiner

100
Add An Event

| | |
|---|---|
| Time Zone: | Pacific Standard Time ⌒105 |
| Event: | ⌒110 |
| Event Type: | Appointment ⌒115 |
| Event Date: | January 2 2007 ⌒120 |
| Time: | ⊗ Start: 1pm 00    ○ ALL Day ⌒125 |
| | Stop: 2pm 00 |

135⌒ Place:

140⌒ Notes:

145⌒ Sharing:
⊗ Private    ○ Public

150⌒ Repeat:
○ Repeat Every Day
○ Repeat on the First Sun of the month
⊗ No repeat

End Date:
⊗ No End Date.
○ Until January 3 2007

160⌒ Invite:
Enter the email addresses:

165⌒ Reminders:
○ Do not send a reminder.
⊗ Remind 15 minutes before the event.

SIMPLIFIED CALENDAR EVENT CREATION

CROSS-REFERENCE TO RELATED APPLICATIONS

This application is a continuation of and claims the priority benefit under 35 U.S.C. § 120 to commonly-assigned and U.S. patent application Ser. No. 12/011,314, entitled "SIMPLIFIED DATA ENTRY," listing Nicholas Wilder, Narendra Rocherolle, and Julie Davidson Rocherolle as inventors and filed on Jan. 25, 2008, which issued as U.S. Pat. No. 9,286,935 on Mar. 15, 2016, which claimed priority under 35 U.S.C. § 119(e) to: (1) U.S. Provisional Patent Appl. No. 60/887,140, entitled "SYSTEMS AND METHODS FOR SIMPLIFIED EVENT ENTRY," filed Jan. 29, 2007; (2) U.S. Provisional Patent Appl. No. 60/887,797, entitled "TAG SHARING," filed Feb. 1, 2007; and (3) U.S. Provisional Patent Appl. No. 60/888,073, entitled "PROFILE GENERATION, USE, AND MANAGEMENT," filed Feb. 2, 2007. Each of the aforementioned patent documents is incorporated by reference herein in its entirety.

This application is related to commonly-assigned U.S. Pat. No. 8,161,069, issued on Apr. 17, 2012, entitled "CONTENT SHARING USING METADATA," which is incorporated by reference herein in its entirety.

This application is related to commonly-assigned U.S. Pat. No. 9,094,469, issued Jul. 28, 2015, entitled "PROFILE GENERATION, USE, AND MANAGEMENT," which is incorporated by reference herein in its entirety.

BACKGROUND

A. Technical Field

The present invention pertains generally to user interfaces and data, and relates more particularly to systems and methods for simplifying data entry.

B. Background of the Invention

The creation of events for a calendar application, whether that application is a desktop application or a networked application typically involved long and detailed forms in order to populate many database fields used to describe a typical event.

FIG. 1 depicts an example of a typical interface provided to users to enter event information into a calendar application. The design of the entry interface 100 requires a user to enter numerous pieces of information and respond to a number of questions. For example, the interface 100 has the user select the time zone 105, enter an event description or event summary 110, and classify the event 115. Then, the user must specify the time 125, date 120, and location 135 of the event. Additional data fields that include sections for notes 140, sharing 145, event repeat information 150, invitations to the event 160, and reminders 165 are also provided. Interface 100 may also include even more fields that may be required or provided to a user, but are not shown 170 in FIG. 1.

Interfaces such as the one illustrated in FIG. 1 are almost universally employed because they are easy to implement. However, such interfaces are typically so vast that they consume an entire screen view. Sometime the interface can exceed a single screen view, which requires the user to scroll to the additional section. In some instances, the interface may span more than one page, which requires a user to move to another page or pages to view and complete the remainder of the entry.

Although these interfaces may be easy to implement for a programmer or applications developer, they can be inefficient and time consumer for the users who must traverse them just to enter an event. Accordingly, what is needed are systems and methods for entering event data that are more efficient and better suited for users than traditional event entry interfaces.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure ("FIG.") 1 depicts, for purposes of illustration, an example of an interface provided to a user to input a calendar event.

DETAILED DESCRIPTION OF THE PREFERRED EMBODIMENTS

Aspects of the present invention relate to systems and methods for providing concise entry of information into an application, such as a calendaring application. In embodiments, an entry may be provided via a single entry interface, which may be referred to herein as a "one box" entry. In embodiments, the present invention simplifies the creation of an event through parsing, fixed or suggested formats, reserved syntax, contextual information, display logic, or combinations thereof. In embodiments, an event may be a new calendar event, which may comprise several database fields including, but not limited to: summary, start date/time, end date/time, notes, invitees, location, tags, privacy setting, repeat pattern, reminder setting, and attached documents. Embodiments of the present invention may also simplify or streamline the entry process by enabling or triggering actions related to the event. Embodiments of the present inventions may include the creation of an event by traditional web post, ajax web post, email, SMS/text messaging, instant messaging (IM), and/or desktop or embedded widgets.

In the following description, for purpose of explanation, specific details are set forth in order to provide an understanding of the invention. It will be apparent, however, to one skilled in the art that the invention may be practiced without these details.

Reference in the specification to "one embodiment" or "an embodiment" means that a particular feature, structure, characteristic, or function described in connection with the embodiment is included in at least one embodiment of the invention but may be in more than one embodiment. The appearances of the phrase "in one embodiment" or "in an embodiment" in various places in the specification are not necessarily all referring to the same embodiment.

Figure 2:
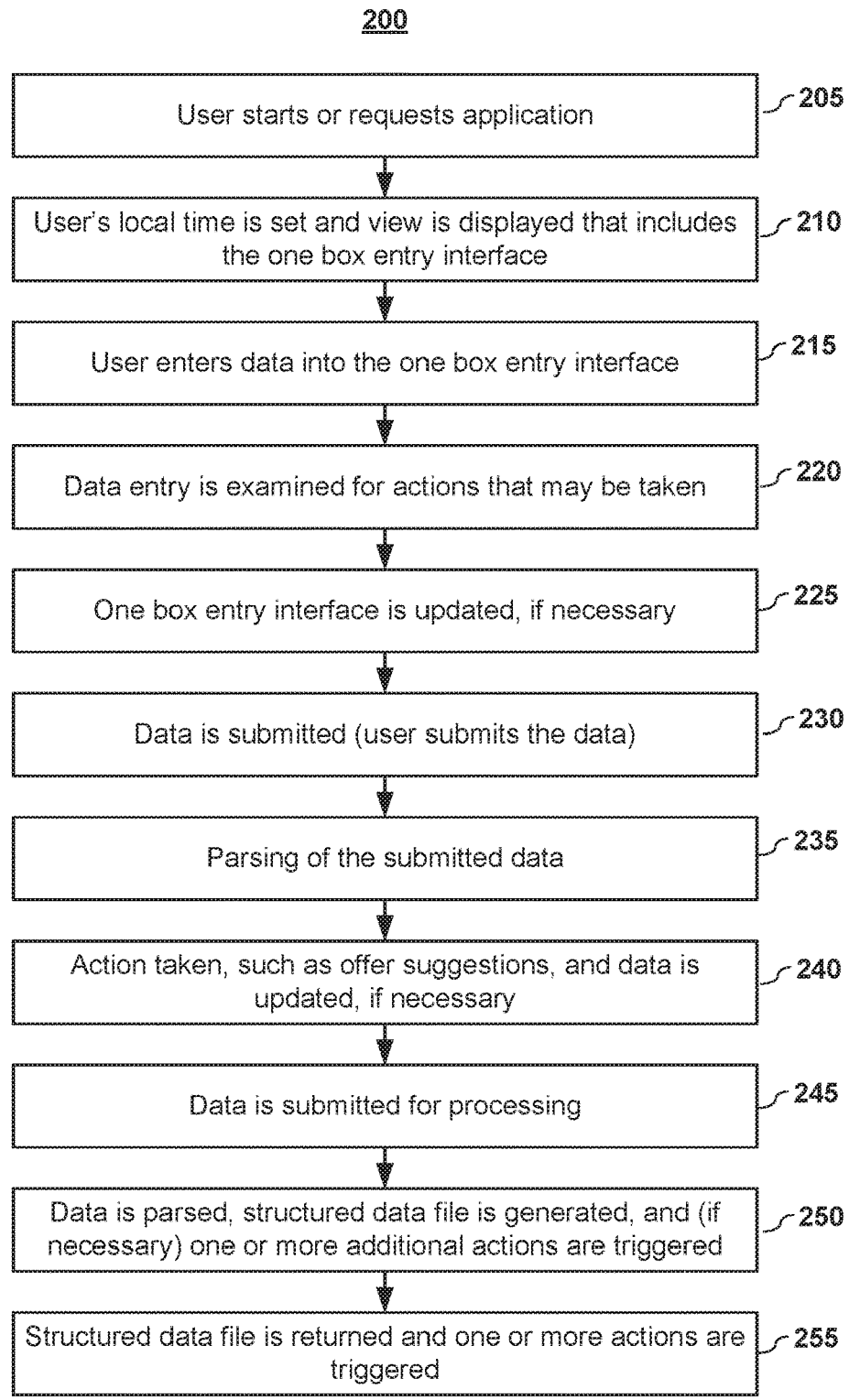
FIG. 2 depicts an embodiment of a method for providing a single interface (one box entry interface) for event entry according to an embodiment of the invention.

FIG. 2 depicts an embodiment of a method for processing an event entry according to an embodiment of the present invention. It shall be noted that the method presented in FIG. 2 is an embodiment of a method that may be performed according the teachings of the present invention; accordingly, one skilled in the art shall recognize that steps may be added, removed, and/or reordered. The method illustrated in FIG. 2 may be embodied in an application, which may be a calendaring application. In embodiments, the application may operate on a single device. In alterative embodiments, the application may be a distributed application and operate on more than one device. In embodiments, the application may be an Internet application, wherein a user interfaces with the application through a web browser.

Returning to FIG. 2, a user may initiate a request (205) to access an application, which may be a calendaring application. In an embodiment, the user may enter a web address (e.g., a Uniform Resource Locator (URL) for a web service, such as 30Boxes), which initiates a server request. When the application launches (which shall be understood to include displaying a web page), the user's local time (ULT) may be set. For example, in an embodiment, the user's local time information may be obtained from the computer system on which the user is accessing the application. In an embodiment, the user's local time information may be stored in an account profile; or alternatively, the user's local time information may be deduced from the time zone of the browser making the request of the server. In an embodiment, upon loading the web site, if the server recognizes a logged-in user at the client, but does not know the user's time zone, the server 1130 may send to the client 1125 a small page that contains javascript code to determine the user's time zone and send that information to the server. The time zone may then be stored in a browser cookie for a period of time.

Figure 3:
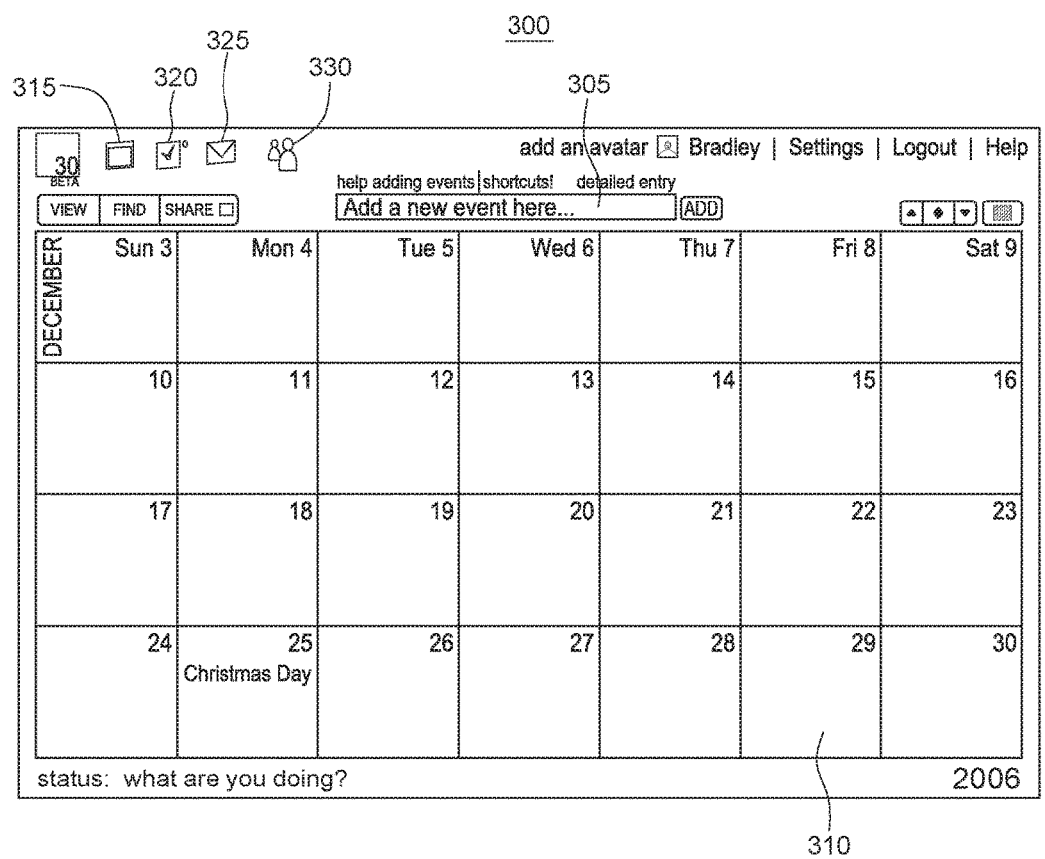
FIG. 3 depicts an embodiment of a calendar application interface with a one box entry interface according to an embodiment of the invention.

Once loaded, a view with a single entry interface may be displayed (210) to the user. FIG. 3 depicts an embodiment of a view or interface 300 with an interface 305 for entering information according to an embodiment of the present invention. In the embodiment depicted in FIG. 3, the entry interface 305 comprises a single entry box that may be used in conjunction with a calendar application to enter an event. In embodiments, the view may display or include links to additional items or functions. For example, calendar interface 300 displays the user's calendar 310 and links to other functional sections of the application, such as a link 320 to a task management section, a link 325 to a communications section, and a link 330 to contacts or buddies.

The depicted embodiment also includes a link 315 to the calendar section of the application. In embodiments, selection of the link 315 may cause a primary view of the calendar to be displayed to the user. For the purposes of illustration, a primary view referred to herein will be a month view or four-week view 310.

Figure 4:
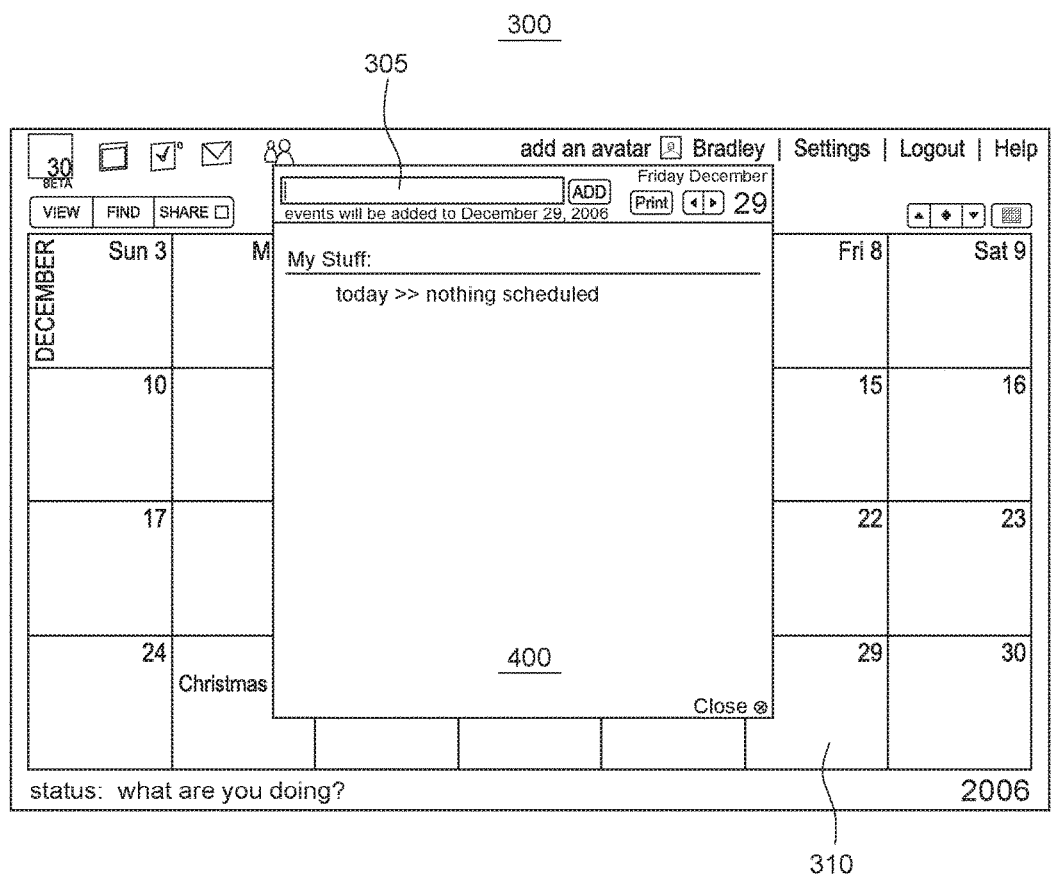
FIG. 4 depicts an alternative embodiment of a calendar application interface with a one box entry interface according to an embodiment of the invention.

FIG. 4 depicts an example of an alternative view or interface, which view is a day view 400. In the depicted embodiment, the day view 400 may be superimposed over the primary view 310. However, it shall be noted that the primary view may be a different view such as, for example, one or more years, one or more months, one or more weeks, one or more days, fractional parts of any of the foregoing, or any combination thereof. In embodiments, the primary view may be user-selected.

A user may add an event to the calendar application by inputting (215) data into the one box interface 305. In embodiments, the calendar application may use parsing, fixed or suggested formats, reserved syntax, contextual information, natural language logic, display logic, or combinations thereof to ascertain information regarding an event. For purposes of illustration various embodiment and examples are provided below.

In embodiments, data entered into the one box entry interface 305 may be examined (220) to determine if an action or actions may be taken. In one embodiment, each keystroke of the user inputted data may be examined for specific syntax or contextual clues. These specific sets of syntax and clues may be referred to herein as being part of pre-set data, readily-identified data, or triggers. In an embodiment, syntax clues may be a reserved word, text format, or character used to help determine meaning or action when parsing. It shall be understood that the use of the term "words," "clue," or "text" shall be understood to mean any symbol which may be entered by a user or any combination thereof, regardless of whether any such inputted symbol or collection of inputted symbols form a commonly readable or identified "word" or "text." In embodiments, the inputted data may be parsed and may be compared against one or more sets of pre-set data, such as a set of syntax and/or contextual formats.

If data conforming to a specific syntax or a contextual clue is identified, an action may be taken. Examples of actions include, but are not limited to, prompting the user for additional information, providing additional information to the user, and/or initiating action with a third party (person, application, device, and/or system).

Figure 5:
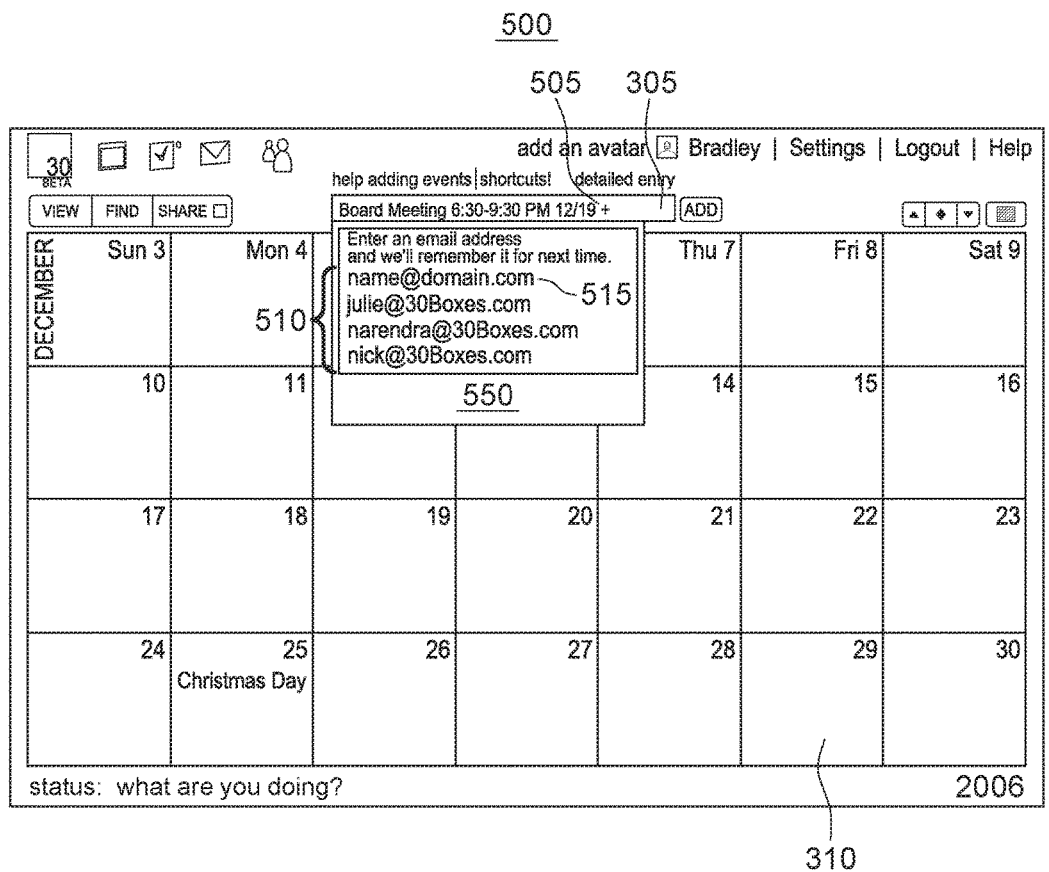
FIG. 5 depicts an embodiment of a one box entry wherein the one box entry interface provides additional prompts to a user according to an embodiment of the invention.

Consider, by way of illustration, the example depicted in FIG. 5. FIG. 5 depicts a calendar interface 500, in which a user has started to enter an event. The user has inputted the data: "Board Meeting 6:30-9:30 PM December 19+". In an embodiment, even before the user has submitted the event, examination and identification of the symbol "+" may trigger the action of altering the interface 500 by displaying a window 550 with a list of potential invitees 510. That is, in embodiments, data wizards may operate in conjunction with the one box entry interface to provide prompts to the user. In embodiments, keywords, context words, and/or set syntax may be used as triggers that initiate the data wizard prompts. In the example depicted in FIG. 5, the use of the "+" symbol triggered an invitation prompt. Rather than requiring the user to enter email addresses, the user enters the "+" symbol and may then select one or more email addresses from a pre-populated list. In embodiments, the pre-populated list may be obtained from the user's contacts/ buddies. If the email is not included, the user may add the email address and it will be displayed the next time the invitation data wizard is triggered. In embodiments, one or more of the data wizards may be dynamic. For example, a data wizard may cause an external email address book to be loaded via Ajax to obtain access to email addresses. Thus, it shall be noted that an aspect of the present invention includes monitoring for certain symbols or combinations of symbols that invoke shortcuts to data entry.

Figure 12:
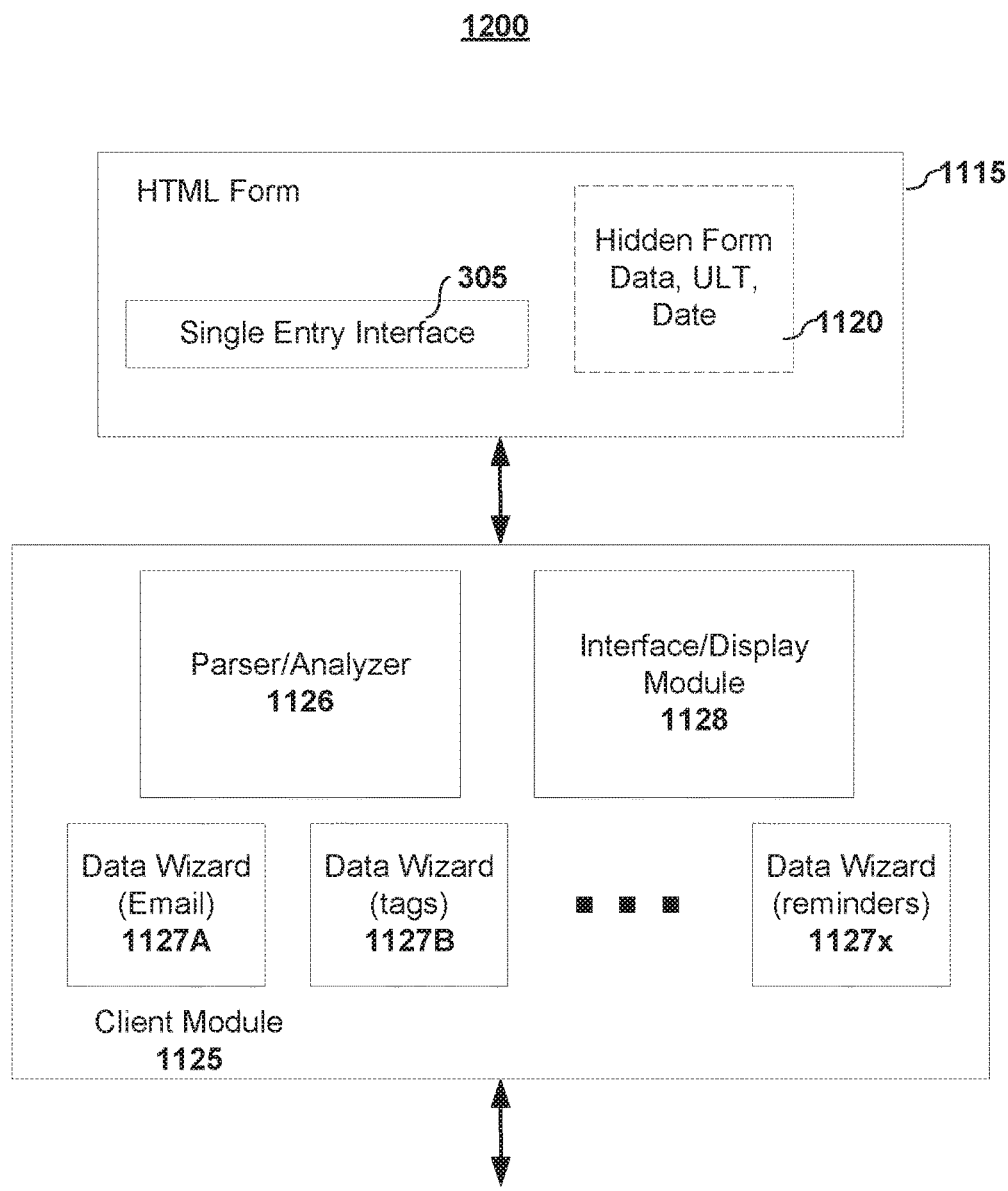
FIG. 12 depicts an embodiment of a client module according to an embodiment of the invention.

In the embodiment depicted in FIG. 12, the data wizards 1127 may reside on a client module 1125. The client 1125 may include client-side logic functions that determine when an action should be taken based upon the inputted data and triggers an appropriate data wizard or wizards 1127. Examples of data wizards include, but are not limited to email addresses 1127A, tags 1127B, to do lists (not shown), repeats (not shown), and reminders 1127x. In an embodiment, data wizards may comprise blocks of HTML and javascript that facilitate the selection of certain options related to event creation and trigger either a string of post-pended text to an input form element or the creation of a hidden form element.

Examples of pre-set/readily-identifiable data, such as syntax or context clues, that may invoke prompts or data wizards may include, but are not limited to:

1) the word "tag" followed by a space may trigger a drop-down list of the user's list of tags (if any) by which the user may classify the event with one or more tags, such as, work, family, volunteer group, church, etc.;

2) the character "+" may trigger a drop-down list of email addresses for the user's Buddies (if any);

3) the word "repeat" followed by a space may trigger a drop-down list of repeat intervals;

4) the word "remind" followed by a space may trigger a drop-down list of reminder intervals; and 5) the word "via" preceded by a "remind" interval and followed by space may trigger a drop-down list of means by which the user may be contacted to be reminded, such as, by one or more of the following: email, SMS/Text messaging, instant messaging, fax, etc. This contact information may be included in the user's profile.

Figure 6A:
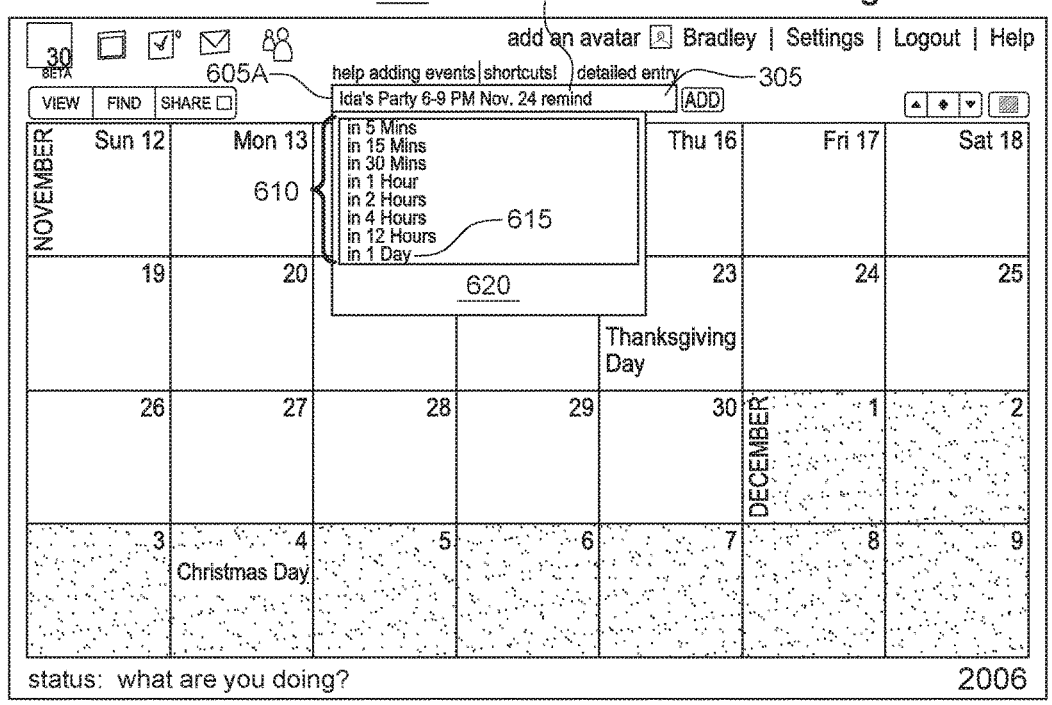
FIGS. 6A and 6B depict an embodiment of a one box entry wherein the one box entry interface provided an additional prompt to a user and the one box entry is amended to reflect the results of the user-selected information according to an embodiment of the invention.
Figure 6B:
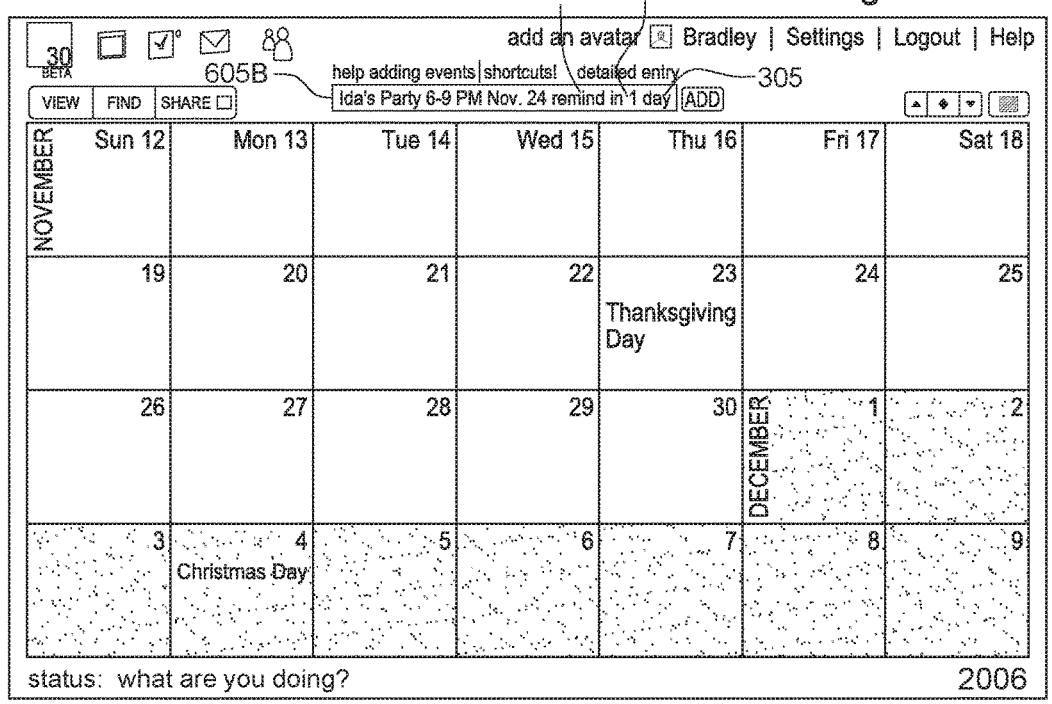

Returning to FIG. 2, the one box interface 305 may be updated (225), if necessary. In embodiments, a selection from a data wizard may be appended to the inputted data in the one box interface. Consider, by way of illustration, the example depicted in FIGS. 6A and 6B. FIG. 6A depicts a view 600 in which a user has entered into the one box interface 305 an event that includes "remind" 625, which has triggered a drop-down window 620 with a list of potential remind times 610. Assuming for purposes of illustration that the user selects "in 1 Day" 615 from the drop-down list 610, the one box entry interface 305 may be updated to append the selected time interval. Thus, the initial entry 605A of "Ida's Party 6-9 PM November 24 remind" is updated to "Ida's Party 6-9 PM November 24 remind in 1 Day" 605B. It should be noted that not all entries may require updating, and thus step 225 may be optionally performed. Alternatively, information selected or added by a user could be set in hidden fields instead of and/or in addition to being appended in the one box entry.

Figure 7A:
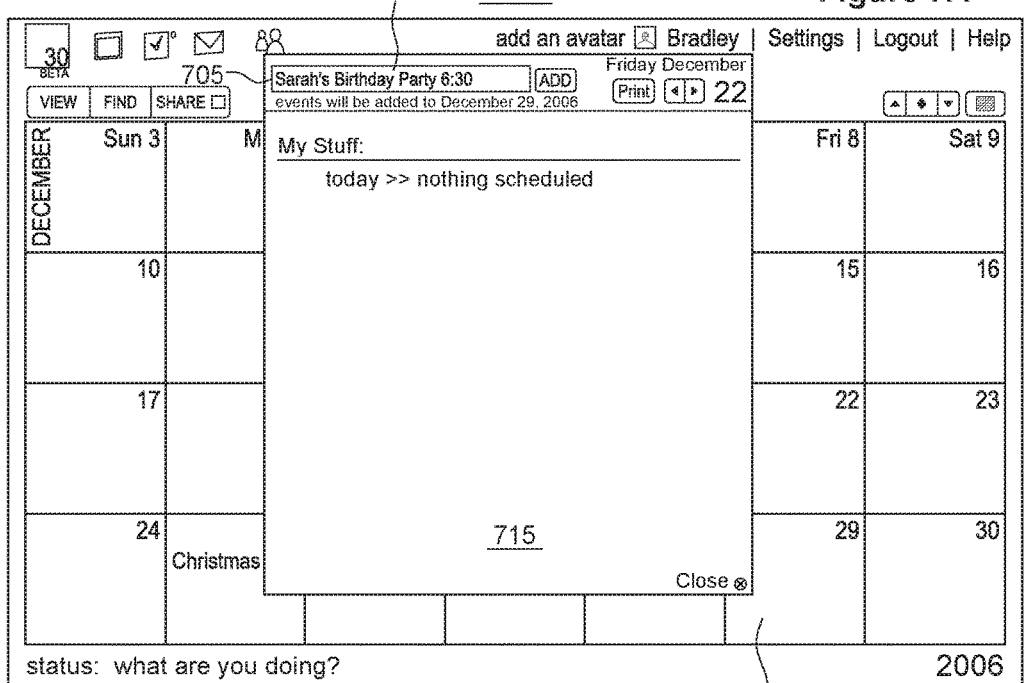
FIGS. 7A and 7B depict an embodiment of a one box entry wherein the one box entry interface provided additional prompts to a user based upon information extracted from the entered text according to an embodiment of the invention.
Figure 7B:
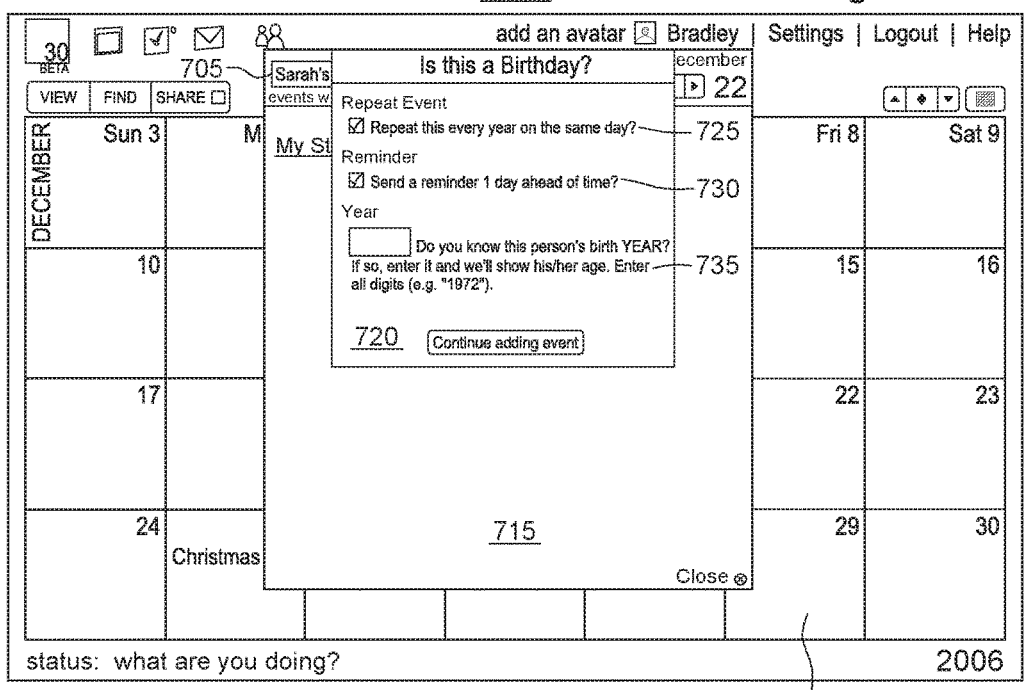

It shall also be noted that data wizards or prompts may be provided for other reasons, including but not limited to, providing options for entry of event information, to resolve ambiguities, or to obtain user input on additional matters. Consider, by way of illustration, the example depicted in FIGS. 7A and 7B. As illustrated in the interface 700A shown in FIG. 7A, a user has entered the event "Sarah's Birthday Party 6:30" 705 in the one box entry 305 while in the day view 715 of December 22. When the user submits (230) the inputted text, the inputted text 705 may be parsed (235) and actions may be taken (240) depending upon the results of the parse. For example, identification of variants of the word "Birthday" or "Anniversary" may trigger a birthday data wizard or anniversary data wizard. As illustrated in the interface 700B shown in FIG. 7B, identification of the word "Birthday" in the inputted data 705 may cause a prompt 720 to be displayed to the user that asks questions related to the birthday, such as, whether the user wants to have the event repeat annually 725, whether the user wants a reminder sent 730, and whether the user wants to include additional information such as the person's birth year 735. Additional prompts might include adding an item to the user's To Do lists, such as "Buy Birthday Gift." The user may also be offered the option of having reminders of the To Do item sent at a specified interval or intervals and via a specific means (email, SMS/Text messaging, instant messaging, fax, etc.). As mentioned above, data wizards may initiate interaction or interact with a third party or outside service.

It should also be noted that to further reduce the amount of data that a user may need to input into the one box interface and/or to facilitate processing of an event, embodiments of the present invention may utilize assumptions. In embodiments, additional data may be used to determine what assumptions should be used. For example, the view from which a user inputs data into the one box interface 305 may be noted and assumptions may be made based upon that view. In an embodiment, it may be assumed that any entry made to a primary view that does not contain an explicit date (e.g., Feb. 2, 2007) or relative reference to a date (e.g., next Thursday) may be assigned the current date of the user's local time. It may be assumed that entries made from a day view may be assigned a default time of that date. Thus, for example, because the event depicted in FIG. 7A was entered while in the day view 715 of December 22 and because no date was specified, it may be assumed that the event occurs on that date. In embodiments, additional assumptions may be made. For example, in an embodiment, relative date references may be assumed to be in the future. That is, if the user enters "Tuesday," it may be assumed that the next Tuesday in the future (based on the user's local time) may be selected for the date of the event.

Returning to FIG. 2, once the action (240) has been taken (if any), the data may be submitted for processing (245) to extract the event information. In embodiments in which the present invention operates in a client-server environment, submission (245) of the inputted data may involve transmitting the inputted data to a server, such as for example, system 1130. It should be noted that additional data may also be transmitted, including, but not limited to, user data, hidden form data, and user local time data. The data may be parsed (250) and a structured data file may be generated (250) from the parsed data. The structured data file may contain one or more field related to the event including, but not limited to: event summary, start date/time, end date/time, notes, invitees, location, tags, privacy setting, repeat pattern, reminder setting, and attached documents. It shall be understood that in embodiments the structured data file may be a database record or multiple records. If necessary, one or more additional actions may also be triggered (250).

Additional actions include, but are not limited to, causing one or more actions to be performed contemporaneously and/or at a future date. The action may involve interfacing with one or more applications. The applications may be part of data manager 1130, or data manager 1130 may interact or otherwise interface with the applications to perform the action, such as for example, sending invitations to invitees of the event.

It should be understood that in embodiments, steps 235 and 240 may be performed on the client side, such as by example client module 1125, and that steps 245-255 may be performed on the server side, such as by server 1130. However, one skilled in the art shall recognize that a single system may perform the steps. Accordingly, in embodiments, steps 235, 240 may be consolidated with step 250 and/or with step 255. Furthermore, some of the steps of the methods depicted herein may be optionally performed. For example, steps 220 and 225 of FIG. 2 may be optionally performed or, alternatively, may be consolidated with one or more other steps, such as steps 235, 240, step 250, and/or step 255.

As previously noted, in embodiments one or more actions may be triggered (240/250/255). Examples of these actions may include, without limitation, the following:

1) If an email has been identified (+emailAddress), one or more of the following actions may be performed:
   a) create an additional "Invitation" event type that will cause this event to appear on the invited user's calendar, if that user has an account with the calendaring application. In embodiments, an invited event may be displayed with a display feature or features indicating to the user that it is an invited event;
   b) trigger messaging (email, SMS, IM, or other) to contact the invitee;
   c) create a new user profile associated with the email if one does not exist. The new user profile may include auto-discovery personalization to gather information related to the email address. For example, the email address may be used to search blogs, posting sites (photo posting, video posting, etc.), web sites, and other places on the Internet to gather information associated with that email address. In embodiments, a profile for a non-user of a service, which may be referred to as a phantom profile, may be created as described in commonly-assigned U.S. Pat. No. 9,094,469, issued Jul. 28, 2015, entitled "PROFILE GENERATION, USE, AND MANAGEMENT," which is incorporated herein by reference in its entirety.
   d) establish a trusted relationship between the user's account and the account referenced by an invitee identifier (e.g., email address, phone number, instant message account name, etc.). For example, a trusted relationship may be obtained by contacting the email address recipient and having the person verify himself/herself. In embodiments, a trusted relationship may be formed by sending a unique code in an email to the person. By selecting or clicking a link in the email message with the unique code (or entering that code on the web site), a trusted relationship may be formed because the email address was valid.
2) Repeat—repeat interval may be set in the calendar event.
3) Remind—a reminder may be set to be delivered according to the user's preference (email, SMS, IM, or other).
4) Examine the Notes field and take an action responsive to data in the Notes field.
5) Parse phone numbers and hotlink the numbers so that they are dialed or can be quickly dialed—such feature is of particular benefit to mobile versions of the present invention operating on a mobile phone or PDA with phone capabilities.
6) One or more tags may be associated with an outside or third-party service. In embodiments, a tag may be associated with one or more web services and may be triggered immediately or in a scheduling system. Consider, by way of illustration and not limitation, the following example: A user inputs an event to wash his clothes on February 26 and sets a reminder using the following "tag sms tag washing machine tag twitter". On February 26, data manager 1130 and/or client module 1125 cause the following to occur: a) the user is sent an SMS message to remind him; b) an http request with xml data is made to his washing machine and it starts running; and c) an http request is made to Twitter with his credentials and a blog about it is posted to his friends.

In embodiments, system 1130 may perform some or all of the above action or may interface with one or more systems or applications to perform the action, including without limitation a client module. For example, server 1130 may interface directly or indirectly with an application 1145 (e.g., email, SMS, IM, etc.) to have a reminder sent or to notify an invitee. In embodiments, the application or system 1145 may be part of data manager 1130 and/or may be a third-party application or system 1145. In embodiments, the client 1125 may perform one or more of the actions. For example, display actions may be performed by client module 1125 upon return of the structured data file.

In embodiments, the structured data file is returned (255) to the user and one or more actions may be triggered upon return. In an embodiment, the returned data may comprise or also include html and/or javascript code derived from the structured data. In an embodiment, the client-server system 1100 may employ AJAX (asynchronous javascript and xml, which is a method of posting data to a server from a client and affecting an action within a browser without refreshing the entire page) and a client-side display function, which may be part of the client-side processing of the client module 1125, may be called as part of the actions. The local data objects may be updated and a Display Update function or functions may be triggered. In embodiments, the calendar display may center on the new event and trigger a visual notification, such as a color flash.

Other actions triggered (240/250/255) may include without limitation:

1) examining the notes field or other fields in the structured data to identify actions such as converting URLs to hyperlinks; and
2) examining the notes field or other fields in the structured data to identify locations or direction information and add a map or directions or a hyperlink to a mapping service (e.g. Mapquest, Yahoo! Maps, Google Maps, etc.)
3) providing weather forecasts (or hyperlinks to the information) for locations;
4) displaying text according to tags—certain tag types create display effects (such as colored fonts) or text formats (such as strikethrough); and
5) the tag "important" displays an importance indicator (such as a star) for an event.

Figure 8:
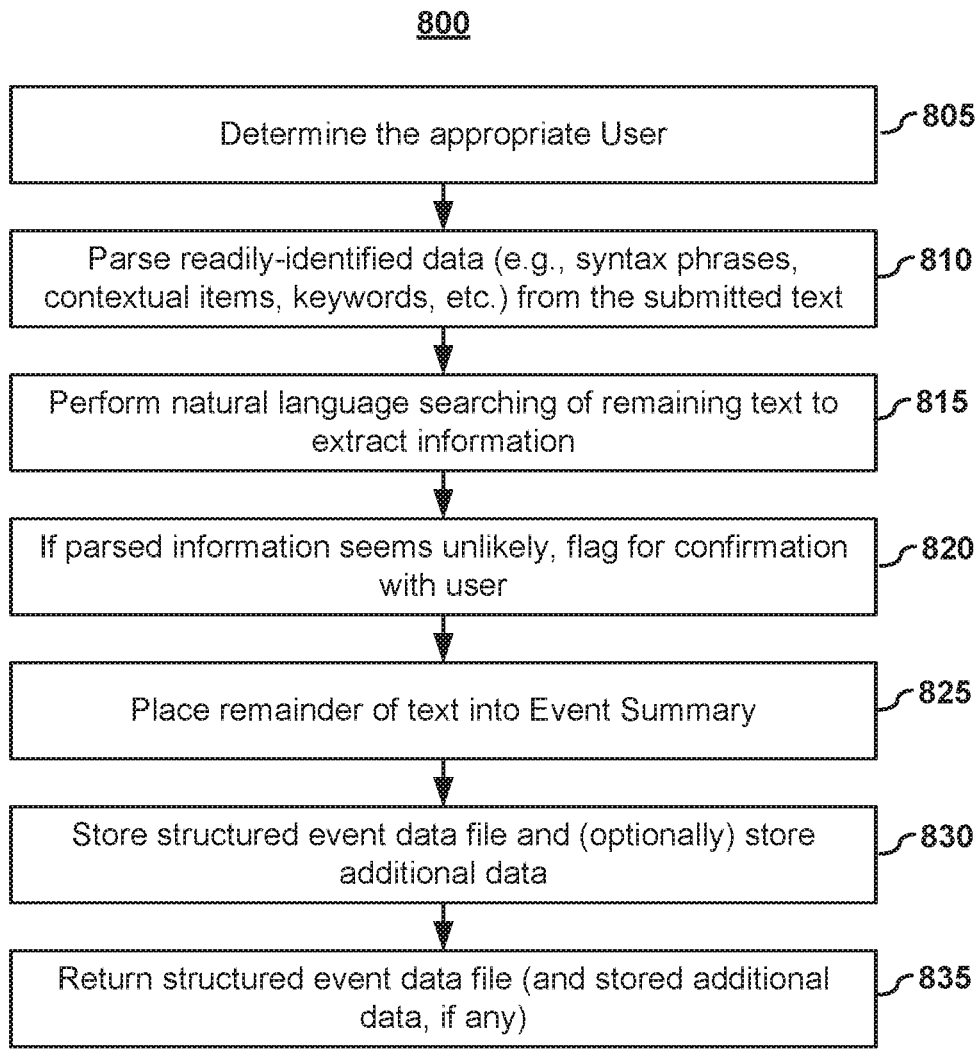
FIG. 8 depicts an embodiment of a method for processing data submitted by a user according to an embodiment of the invention.

Turning to FIG. 8, depicted is an embodiment of a method for processing submitted data. In an embodiment, the method of FIG. 8 may correspond, at least in part, to steps 245-255 of FIG. 2. Upon submission of the data, a series of algorithms or operations may be applied to the data. In an embodiment, the data may be posted to a server, such as server 1110 of FIG. 11. The server may determine (805) the appropriate user to associate with the submitted data. Identification of the user may be an issue where, for example, the data is not submitted via a user logged into the calendaring application. Examples of data submitted for processing that have not be submitted via a user logging into the application through a web browser may include, without limitation, submission of via email, SMS/Text message, or instant message. In such cases, for example, the user may need to be identified (805) by an email, phone number, user name, or other unique identifier.

Consider, for purposes of illustration, submission of information by email. A user may schedule an event by sending an email to the calendaring application. For example, an email may be sent to an email address at 30boxes.com where it is piped from a mail server to the application layer. In an embodiment, the email may be authenticated (either by recognizing the "To" address as a custom email address used for that user only or by using the "From" address and comparing it to existing calendaring users). In an embodiment, the email may be addressed to additional individuals as well and those email addresses may be included in the user's list of emails/buddies. In an embodiment, those emails may be included as invitees of the event.

In an embodiment, the subject line and/or the message body may be considered as an equivalent to data entered into a one box entry interface 305. In an alternative embodiment, the subject line of the email may be treated as a one box data entry and undergoes the steps described herein from the point that the data is posted to the server. In an embodiment, the body of the email may be parsed by separating out MIME types, and if it contains a plain text or html MIME type, the body may be converted into an html page that is stored in a database (such as database 1135A) or a file system (1135B) and may be linked to the new event as an attachment. In embodiments, other MIME types may be supported such as audio, video, images, and the like.

In an embodiment, a response, such as a return email or other notification, may be sent to the user alerting the user of the success or failure of the event creation.

Returning to FIG. 8, following identification of the user (805), the submitted data may be parsed to locate readily-identified text, such as syntax clues, contextual clues, keywords, and the like. In an embodiment, this readily-identified information may be parsed in an iterative fashion. Consider, by way of illustration, the following examples of readily-identified text that may be parsed:

a) Phrases containing "remind" or "reminder", such as "remind in 1 hour" denote a reminder to be stored and may be triggered at a later time to remind the user of the event. The reminder may be a variety of common time descriptions, such as 5 minutes, 15 mins, 1 hour, 1 day, 2 weeks, etc., or variations thereof.

b) "+emailaddress" denotes an invitee to the event and may trigger a notification action to the invitee(s).

c) "+emailaddress!" denotes an invitee to the event and may trigger a notification action with an urgency flag. In an embodiment, an urgent notification may involve sending an invitation via SMS/Text Message.

d) "tag tagname" denotes one to N labels which may be used to group or classify events and/or for granting permissions to third parties to access events. In embodiments, an event may be shared using metadata, such as tags, as described in commonly-assigned U.S. Pat. No. 8,161,069, issued on Apr. 17, 2012, entitled "CONTENT SHARING USING METADATA," which is incorporated herein by reference in its entirety.

e) "tag specialTag" denotes a tag that triggers a display action (e.g., tag blue shows the event in a blue font).

f) an asterisk denotes priority.

g) parentheses contain notes related to an event (e.g., second floor, ask for Bob).

h) "private" denotes a privacy setting.

i) square brackets may be used to denote a location (e.g., [san francisco, ca]). In an embodiment, the location information may be used to obtain directions by setting two locations with the square brackets. For example, [location_1|location_2] may be used to obtain directions for the user from location_1 to locations_2. In an embodiment, if a user set his home or work locale in his profile, then he can obtain directions from home (or work) to the location by entering [home|location_2] or [work|location_2].

j) Phrases contain "repeat" denote that the event repeats according to rules specified in the phrase, such as annually, yearly, monthly, weekly, biweekly, daily, etc. and their common abbreviations.

k) "repeat interval until date" denotes a repeating event that has an end date. One skilled in the art shall recognize that other repeat format may be employed depending upon the complexity of the repeat.

l) all uniform resource locator (URLs), for example, strings that begin with http://, may be stored within the notes field. In an embodiment, the URLs may be converted to hyperlinks.

It shall be noted that to aid in the extraction of the event information, syntax, context clues, fixed or suggested formats may be employed. By way of illustration and not limitation, examples are provided in Appendix A.

In embodiments, all readily-identified data may be removed from the submitted data and the remaining text may be submitted for processing (815) using natural language logic (NLL) to extract information. Natural language logic may be used to deduce the intended date of the event from the submitted data. Dates may be explicitly stated in standard formats (5/1/07, May 1, 2007), abbreviated versions (june1, 6.1), or relative references (tomorrow, next tuesday). The dates may be a single date or may be spans (e.g., May1-5). The dates may include a single time or time spans (e.g. May 1 2-3 pm). The natural language logic is used to examine, rearrange, and prepare the text that is thought to contain date and time information. In embodiments, the data may be broken into parts and repeatedly tested with the PHP function "strtotime" until the entire date, time, or date/time span has been deduced. One skilled in the art shall recognize that other string-to-time functions or applications may be employed and that no specific function or implementation is critical to the present invention.

Figure 9A:
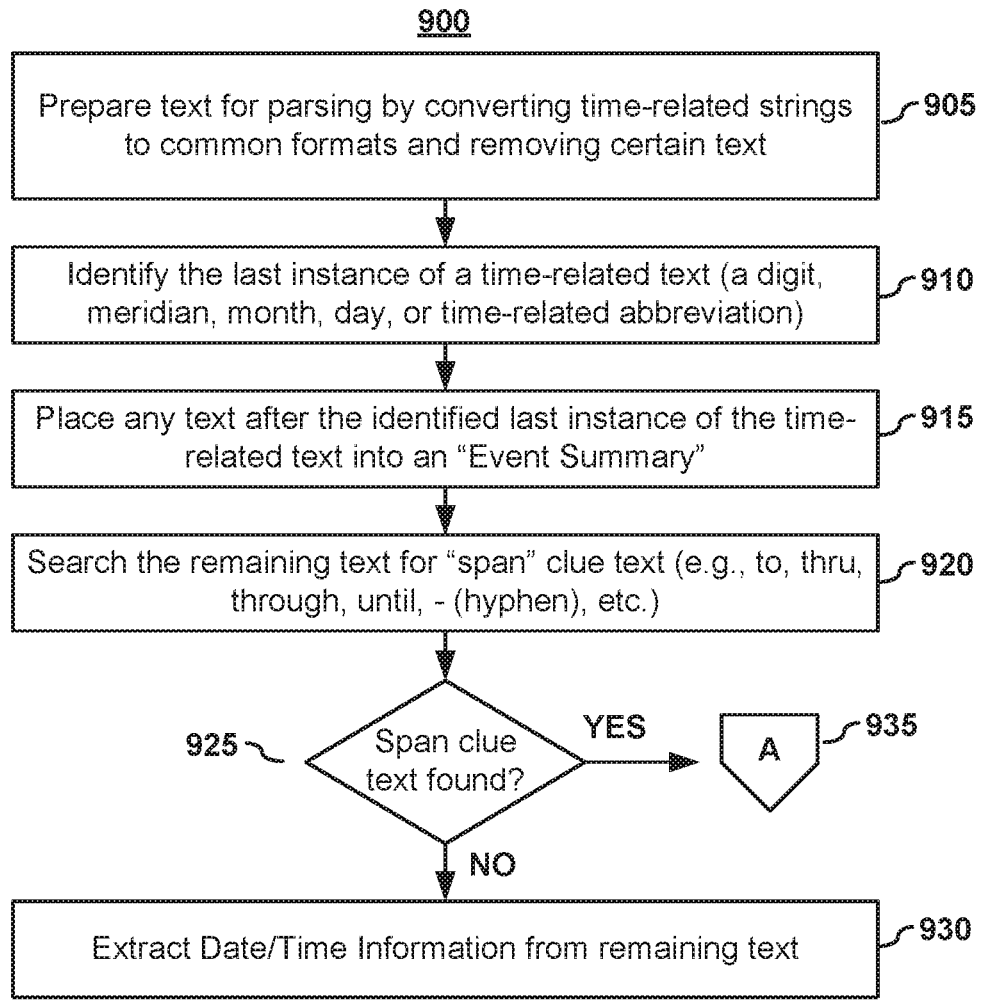
FIGS. 9A and 9B depict an embodiment of a method for parsing text obtained from a one box event entry according to an embodiment of the invention.
Figure 9B:
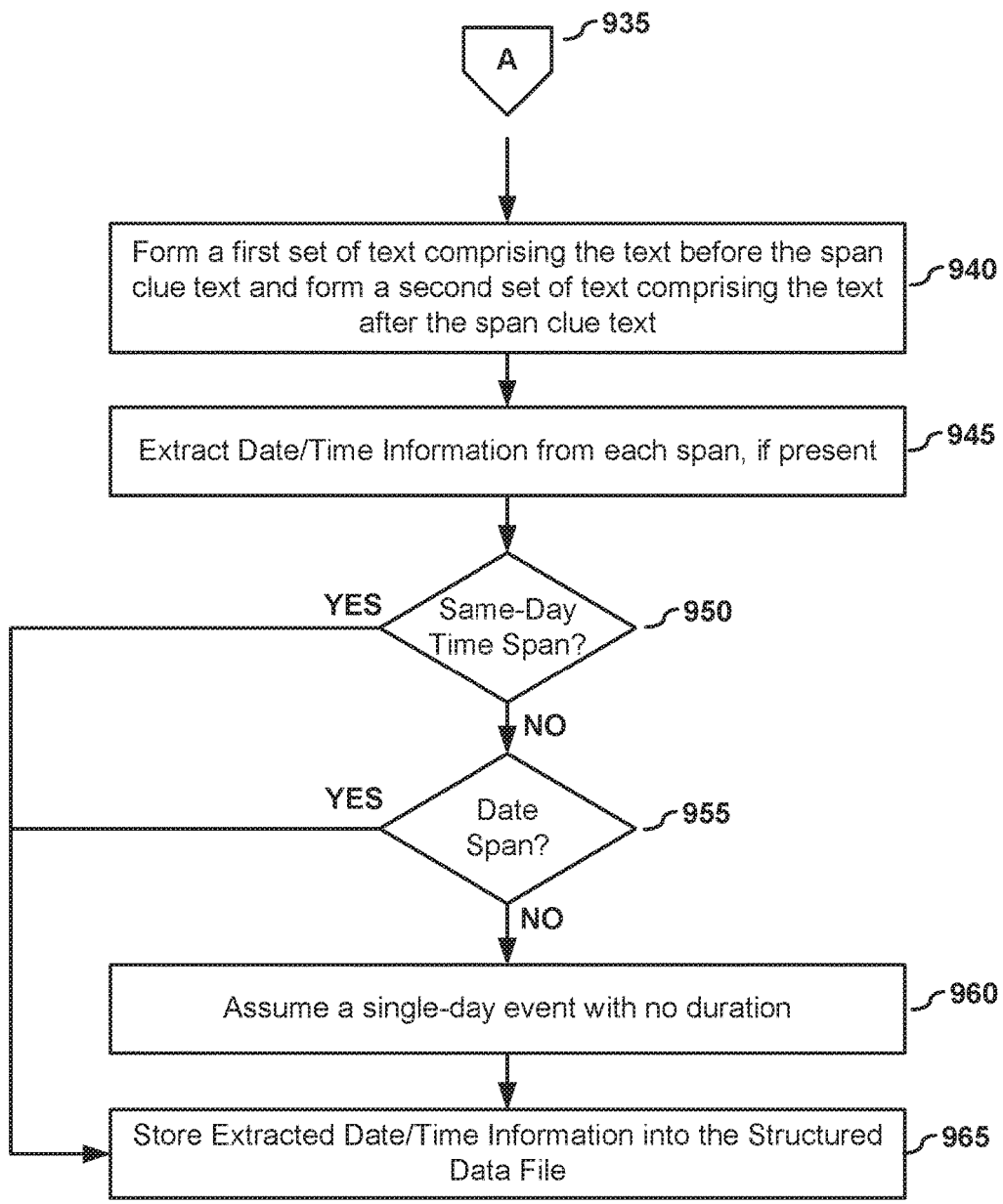

FIGS. 9A and 9B depict an embodiment of a method for extracting date/time information from the submitted text. The text may be prepared for parsing by converting (905) time-related string (that is, date or time) to common formats and remove certain text, such as readily-identifiable data (if any). In embodiments, assumptions may also be made related to the text. Examples of assumptions may include, but are not limited to, relative date references, views from which data was entered, practices of users, practices of a user, formats, etc. In an embodiment, the remaining text may be used because it is not known where the date/time components lie within the text.

For purpose of illustration, listed below are some examples of conversions of time-related strings to regular or common expressions:

a) European-style times (12.15 pm) may be changed to US-style (12:15 pm);

b) 1st, 2nd, 3rd, etc. may be changed to 1, 2, 3 c) day abbreviations (e.g., "tues" and "thurs") may be changed to complete words (e.g., "Tuesday" and "Thursday");

d) space may be added between month names (or their abbreviations) and the date (e.g., "Jan2" changes to "Jan 2").

e) "noon", "midnight" and similar abbreviations may be changed to actual times, such as "12 pm".

f) "a" or "p", when preceded by a time format, may be changed to "am" or "pm" (e.g., 5:00 a changes to 5:00 am, 5 a changes to 5 am).

g) Single characters following a time format may be removed. In embodiments, single characters following a time format may generate erroneous time zone information and are therefore removed.

h) Periods may be removed from meridian abbreviations (e.g., "5 a.m." changes to "5 am").

i) Colons may be added to time formats if they are missing (e.g., "530 am" changes to "5:30 am").

j) Spaces may be removed between the time and meridian (e.g., "5 am" changes to "5 am").

k) The word "at", when preceding a time format, may be removed.

l) If the meridian is missing from a time format, an assumption may be made as to the meridian based on the hour, and the meridian is added. For example, times between 1-6 may be assumed to be PM rather than AM. In an embodiment, if the user has indicated that they use European time standard or 24-hour time (1 pm would be 13:00), a meridian would not be assumed.

m) Commas between date and time formats may be removed.

One skilled in the art shall recognize that the above conversions may not be required to be done for the parsing and that the selection of formats is a choice of style and is not critical to the practice of the present invention.

The modified data may then be examined (910) for the last instance of a digit, meridian, month name, day name, or time-related (time/date) abbreviation. In an embodiment, any text after that instance may be removed and added (915) to the event summary field of a structured message file, or alternatively, may be added to a notes field.

The remaining data may be searched (920) for span clue word (e.g., to, thru, through, until, -, etc.). If a span word is not found (925), the remaining data may be examined (930) to extract date/time information. If a span word is found (925/935), the remaining data may be split (940) in two sets of text, wherein the first set of text comprises the text before the span clue word and a second set of text comprises the text after the span clue word.

Each set of text may be examined (945) to extract the date/time information, if it is present in the set of text. If the two sets represent a same-day span, that information may be stored (965) in a structured data file. If the two sets do not represent a same-day span, the two sets may be examined to determine (955) if they represent a date span. If the two sets represent a date span, that information may be stored (965) in a structured data file. If the two sets do not represent a date span, it may be assumed (960) that the event is a single-day event with no duration, and that information may be stored (965) in a structured data file.

Figure 10:
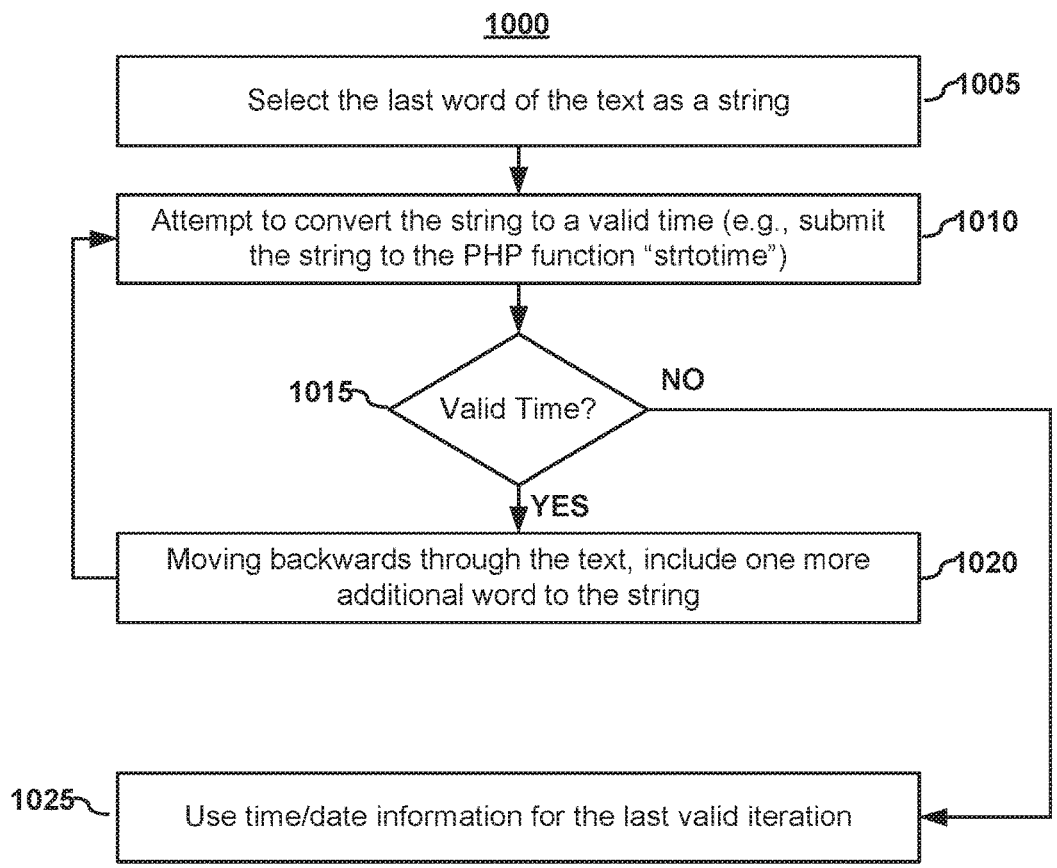
FIG. 10 depicts an embodiment of a method for extracting date/time information from text obtained from a one box event entry according to an embodiment of the invention.

FIG. 10 depicts an embodiment 1000 of a method for extracting date/time information for a string of text according to an embodiment of the present invention. In the depicted embodiment, the last word of the text may be selected (1005) as a string of text. That string may be submitted (1010) to the PHP function "strtotime" to determine (1015) if that string is a valid time/date. This process may be iterated backwards through the text, wherein one more word is included (1020) each time so long as the string continues to return a valid time/date from the PHP function. As soon as there is not a valid time/date returned from the PHP function, the last valid time/date is selected as the time/date information and the parsing for that text is completed.

Returning to FIG. 8, in an embodiment, if the parsed date range seems unlikely (820), the event may be created but the user may be asked to confirm if the dates are correct. In an embodiment, the user may be asked to confirm the dates after the event information has been returned to the user. What seems unlikely may be user-selected or preset. For example, it may be determined that an event that starts or ends more than 330 days in the future or that has a duration over 60 days may be flagged as unlikely. One skilled in the art shall recognize a number of possible situations that may be selected as being unlikely. In embodiments, after removing the date/time related text, the remainder of the text may be selected (825) as the event summary and may be stored in the event summary field of the structured file. In embodiments, the structured data file may be stored in an events database table, such as database 1135A at the system 1110. Also, in embodiments, additional data may be stored in a database 1135A or in a file system 1135B. For example, attachments from emails may be stored and associated with the structured file. As noted previously, the structured file may be returned (835) to the user for display. In an embodiment, any associated additional data may be sent to the client or may be made available to the users.

One skilled in the art will recognize that embodiments of the present invention, some of which are described herein, may be incorporated into a number of different systems and devices including general purpose computers, specialized computers, mobile devices (including without limitation mobile telephones, personal data assistants (PDAs), and multimedia devices), and the like. The embodiments of the present invention may be implemented in software, hardware, firmware, or combinations thereof. It shall be noted that the specific implementation is not critical to the present invention.

It shall be understood that devices or components (or modules), shown in block diagrams are illustrative of embodiments of the invention and are meant to avoid obscuring the invention. It shall also be understood that throughout this discussion that device or components may be described as separate functional units, which may comprise sub-units, but those skilled in the art will recognize that the various devices or components, or portions thereof, may be divided into separate devices or components or may be integrated together, including integrating within a single system, device, or component.

Furthermore, connections between devices, systems, and components within the figures are not intended to be limited to direct connections. Rather, data between these items may be modified, re-formatted, or otherwise changed by intermediary components. Also, additional or fewer connections may be used. It shall also be noted that the terms "coupled"

or "communicatively coupled" shall be understood to include direct connections, indirect connections through one or more intermediary devices, and wireless connections.

Figure 11:
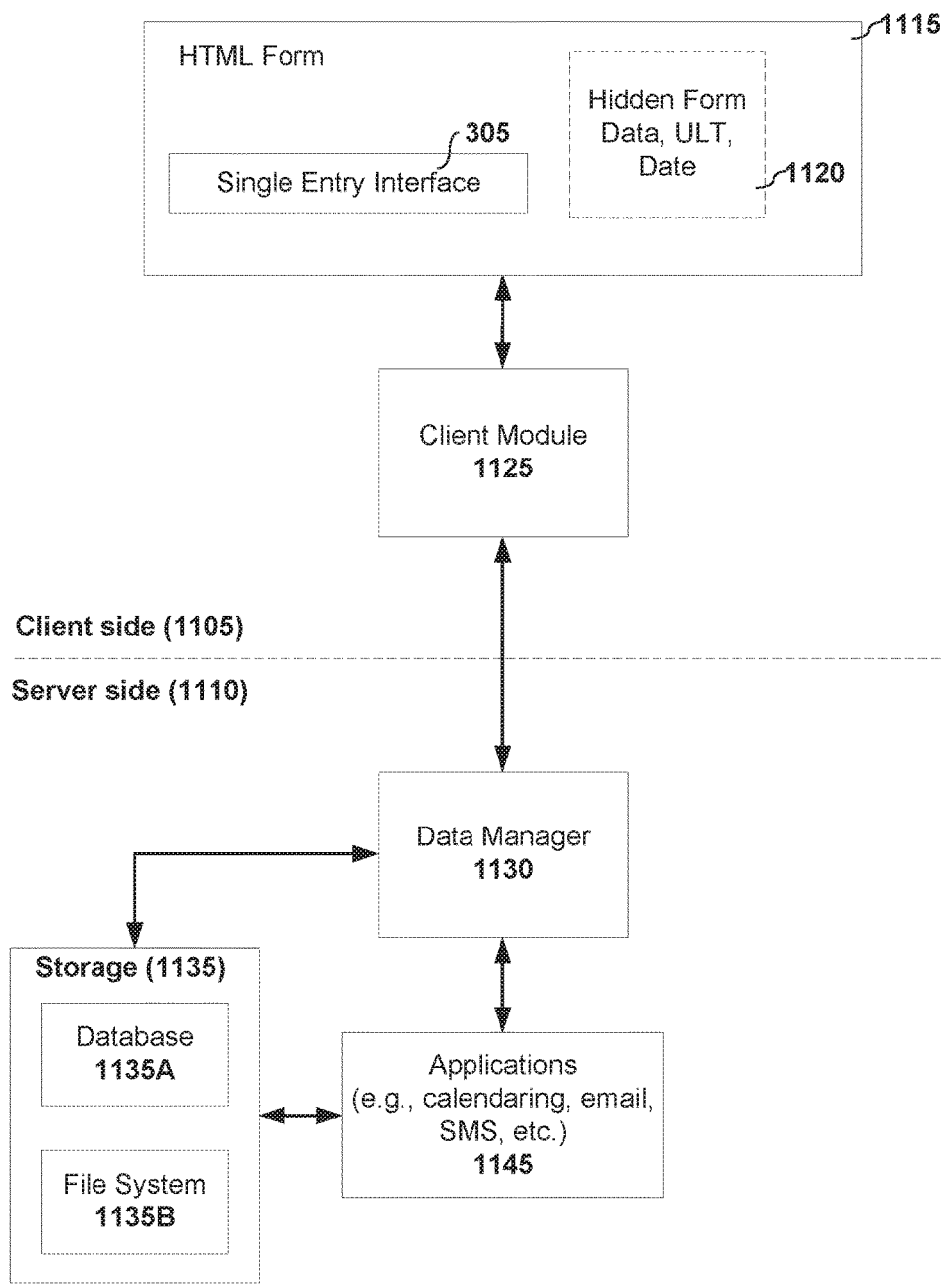
FIG. 11 depicts an embodiment of a system for providing a one box entry according to an embodiment of the invention.
Figure 13:
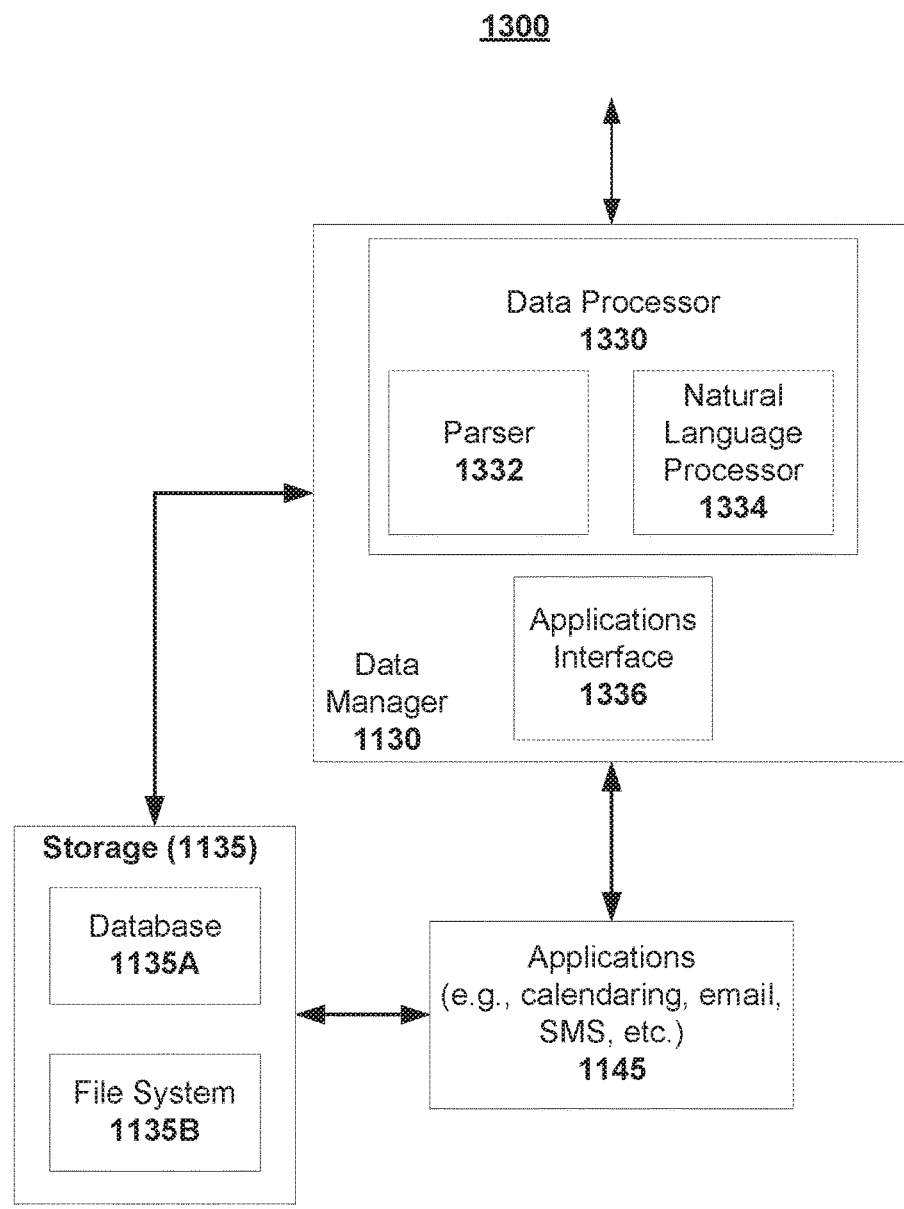
FIG. 13 depicts an embodiment of a data manager according to an embodiment of the invention.

FIGS. 11 through 13 depict embodiments of systems of the present invention, which may perform the steps of methods depicted herein. FIG. 11 depicts a client-server architecture 1100 wherein a method for receiving and processing an event entry may be distributed between one or more applications processed by a client system 1125 and a server system 1130. The system 1100 depicted in FIG. 11 may be part of a network of computers, such as, but not limited to, an intranet or the Internet. FIG. 12 depicts an embodiment of a client system 1200 according to an embodiment of the present invention. FIG. 12 depicts an embodiment of a server system 1300 according to an embodiment of the present invention. It shall be noted that no specific implementation of the methods of the present invention, whether embodied in one or more applications and whether standalone, distributed, or networked (e.g., peer-to-peer or client-server), nor the specific implementation of the device or system is critical to the present invention.

As previously indicated, embodiments of the present invention may be implemented in a web application. For purposes of illustration, an example of such an embodiment is provided herein. In an embodiment, a user loads 30boxes.com, wherein interface/display module 1128 displays a form, such as an html—the time zone is set as part of the html form 1115 and the One Box entry interface 305 is displayed. Assume for this illustration that the user types the following characters:

Mike's Birthday May 1 tag

In the embodiment depicted in FIG. 12, the data wizards 1127 may reside on a client module 1125. The client 1125 may include client-side logic functions that determine when an action should be taken based upon the inputted data and triggers an appropriate data wizard or wizards 1127. In an embodiment, data wizards may comprise blocks of HTML and javascript that facilitate the selection of certain options related to event creation and trigger either a string of post-pended text to an input form element or the creation of a hidden form element.

After the word "tag" has been entered, the client parser and analyzer 1126 recognizes that a trigger text has been added and the appropriate data wizard 1127B causes a prompt (such as a drop-down menu of the user's existing tags) to be displayed for easy selection of one or more tags.

Assume the user selects the following tag:
personal
Also assume that the user ends the entry with an asterisk
Mike's Birthday May 1 tag personal *
In an embodiment, when the "Add" button is clicked, the client module 1125 may parse the text locally and recognizes the event as a birthday. Another data wizard 1127 may initial a pop-up dialog to be displayed to allow further settings. The form data is then submitted to the data manager 1130, which may include data from hidden form fields 1120 and the unstructured data from the one box text.

The data manager 1130 receives the information and the one box text may be parsed to identify syntax clues to create fields for the new event data object. Natural language logic may be used to deduce times, dates, and other fields of the event. During the course of the parsing, certain actions may be triggered. In this example, an annual reminder action will be set for the event. Thus, in embodiments, data manager 1130 may also include data wizards (not shown) or one or more application interfaces 1336 to facilitate interaction with one or more application 1145. The event data may be stored in a table in storage 1135 on the server, and additional data may be stored relating to triggered actions (such as the reminder). It should be noted that storage 1135 may be part of data manager 1130. Applications 1145 may also be part of data manager 1130 and/or may be separate from data manager 1130.

The data is now in a structured format and may be returned to the client. In embodiments, the client 1125 may parse the data locally. For example, the structured data that is returned to the client may be "parsed" by javascript so it is available for use in the javascript programs running on the client browser. The return of the structured file triggers the interface/display module 1128 to updated the user's display to reflect the new event. Additionally, certain display actions may be triggered; in this example, the display includes a star icon and a repeat icon.

One skilled in the art shall recognize that system 1100, server system 1130, client 1105, or portions thereof may be implemented on one or more a computing/instruction-executing device.

Figure 14:
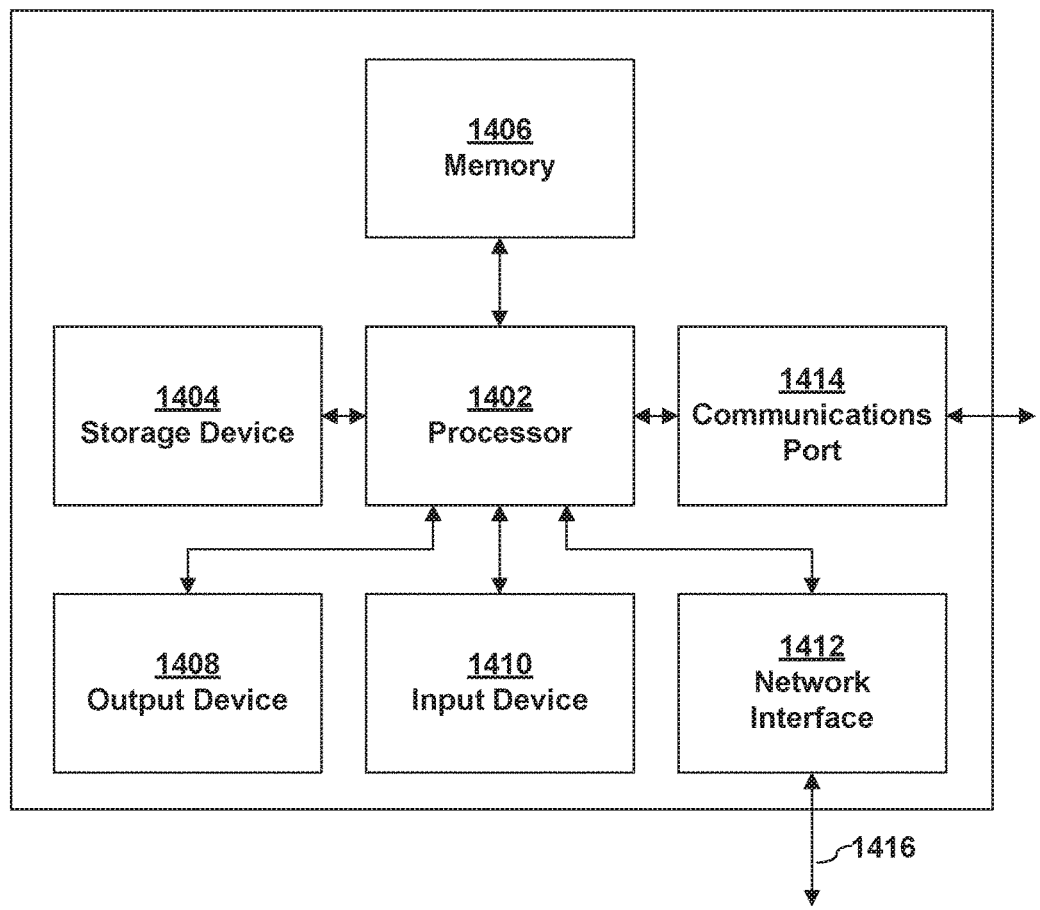
FIG. 14 depicts a function block diagram of a computing system according to embodiments of the present invention.

FIG. 14 depicts a functional block diagram of an embodiment of an instruction-execution/computing device 1400 that may implement or embody embodiments of the present invention. As illustrated in FIG. 14, a processor 1402 executes software instructions and interacts with other system components. In an embodiment, processor 1402 may be a general purpose processor such as an AMD processor, an INTEL x86 processor, a SUN MICROSYSTEMS SPARC, or a POWERPC compatible-CPU, or the processor may be an application specific processor or processors. A storage device 1404, coupled to processor 1402, provides long-term storage of data and software programs. Storage device 1404 may be a hard disk drive and/or another device capable of storing data, such as a computer-readable media (e.g., diskettes, tapes, compact disk, DVD, and the like) drive or a solid-state memory device. Storage device 1404 may hold programs, instructions, and/or data for use with processor 1402. In an embodiment, programs or instructions stored on or loaded from storage device 1404 may be loaded into memory 1406 and executed by processor 1402. In an embodiment, storage device 1404 holds programs or instructions for implementing an operating system on processor 1402. In one embodiment, possible operating systems include, but are not limited to, UNIX, AIX, LINUX, Microsoft Windows, and the Apple MAC OS. In embodiments, the operating system executes on, and controls the operation of, the computing system 1400.

An addressable memory 1406, coupled to processor 1402, may be used to store data and software instructions to be executed by processor 1402. Memory 1406 may be, for example, firmware, read only memory (ROM), flash memory, non-volatile random access memory (NVRAM), random access memory (RAM), or any combination thereof. In one embodiment, memory 1406 stores a number of software objects, otherwise known as services, utilities, components, or modules. One skilled in the art will also recognize that storage 1404 and memory 1406 may be the same items and function in both capacities. In embodiments, one or more of the components of FIGS. 11, 12, and/or 13 may be modules stored in memory 1404, 1406 and executed by processor 1402.

In an embodiment, computing system 1400 provides the ability to communicate with other devices, other networks, or both. Computing system 1400 may include one or more network interfaces or adapters 1412, 1414 to communicatively couple computing system 1400 to other networks and devices. For example, computing system 1400 may include a network interface 1412, a communications port 1414, or both, each of which are communicatively coupled to processor 1402, and which may be used to couple computing system 1400 to other computer systems, networks, and devices.

In an embodiment, computing system 1400 may include one or more output devices 1408, coupled to processor 1402, to facilitate displaying graphics and text. Output devices 1408 may include, but are not limited to, a display, LCD screen, CRT monitor, printer, touch screen, or other device for displaying information. Computing system 1400 may also include a graphics adapter (not shown) to assist in displaying information or images on output device 1408.

One or more input devices 1410, coupled to processor 1402, may be used to facilitate user input. Input device 1410 may include, but are not limited to, a pointing device, such as a mouse, trackball, or touchpad, and may also include a keyboard or keypad to input data or instructions into computing system 1400.

In an embodiment, computing system 1400 may receive input, whether through communications port 1414, network interface 1412, stored data in memory 1404/1406, or through an input device 1410, from a scanner, copier, facsimile machine, or other computing device.

It shall be understood that devices or components (or modules), that may be shown in block diagrams are illustrative of embodiments of the invention and are meant to avoid obscuring the invention. It shall also be understood that devices or components may be described as separate functional units, which may comprise sub-units, but those skilled in the art will recognize that the various devices or components, or portions thereof, may be physically and/or functionally divided into separate devices or components or may be physically and/or functionally integrated together, including integrating within a single system, device, or component.

Furthermore, connections between devices, systems, and components are not intended to be limited to direct connections. Rather, data between these items may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

It shall be noted that the present invention may be implemented in any instruction-execution/computing device or system (or group of devices or systems) capable of processing data, including without limitation, a general-purpose computer and a specific-purpose computer. One skilled in the art will recognize no computing system is critical to the practice of the present invention. The present invention may be implemented on or into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall also be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

It shall also be noted that one advantage of the one box entry interface 305 is its compact size. The one box interface's 305 size allows it to be displayed with other items. Consider, for example, the one box entry interface 305 shown in FIG. 3. The entry interface 305 is readily displayed with the calendar 310 and with other information, such as for example, links to a "To Do" list 320, email or other communications interface 325, and contacts/buddies 330. A benefit of being able to display a single entry interface 305 with other information, such as the calendar, is that a user can readily reference the calendar 310 while entering a new event. This advantage is particularly evident when contrasted with the entry interface 100 depicted in FIG. 1, which consumes the entire screen view or is a separate screen view.

Interfaces, such as the one shown in FIG. 1, are disadvantaged in comparison to the present invention because, among other reasons, they create inefficiencies. First, as mentioned above, a user cannot readily reference the calendar while entering a new event. The user must typically toggle between screens displaying the calendar and the event entry interface, or complete or cancel the event entry and return to the calendar view. Neither approach is particularly satisfactory. Furthermore, because these entry interfaces typically appear on their own screen view/page view, delays may be added while these entry forms are displayed to a user. This delay may not be insubstantial in Internet applications where the entry interface 100 must be loaded as a separate page and then the calendar view must be reloaded upon completion or cancelling of the entry form 100. One skilled in the art shall recognize other advantages of the present invention.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the spirit and scope of that disclosed herein.

APPENDIX A

| Format/Example | Comments |
|---|---|
| event date time (notes) | all sorts of combinations will work for |
| lunch thursday 1pm (cafe centro) | dates and times: dec10, 9-10am, next tuesday, etc. |
| hyperlink | URLs will be added to the notes for an |
| dinner http://slanteddoor.com | event and linked |
| [location] | square brackets create locations that |
| meeting thursday [164 south park, san francisco, ca] | link to a map application and may also provide weather for that city |
| [home\|location] | if a user set his home or work locale in |
| meeting mar4 [home\|164 south park, san francisco, ca] | Settings, then he will get directions from home (or work) to the location |
| +emailOne +emailTwo . . . +emailN | sends out invitations to join the event |
| party 8pm +joe@aol.com +jen@gmail.com | to these email addresses |
| +email! | creates an "urgent" invitation and |
| bowling 10pm +joe@aol.com! | sends a text message to the person invited |
| tag tagOne tag tagTwo . . . tag tagN | tag followed by a space brings a drop- |
| trip to hawaii jan3-8 tag personal tag travel | down menu of existing tags (or lets a user add a new one) -- events can have multiple tags |
| tag color | "easter egg" that will apply a font |
| dentist appointment tag blue | color (e.g., blue, navy, maroon, purple, green red, teal, magenta, olive, lime, orange, aqua and yellow) |
| repeat interval | repeat space provides a drop-down |
| yoga repeat every Thursday | with repeat options |
| repeat interval until date | gives repeats an end date |
| pay heating bill repeat monthly until 6/1 | |
| * | an asterisk assigns the tag "important" |
| * big meeting | to an event, puts a star next to it and puts it at the top of the display |
| private | creates an event that is only visible to |
| doctor's appt. private | the user even if the user shares his calendar |
| remind in timePeriod | remind space gives the user a drop- |
| call with bob remind in 15 minutes | down for reminder intervals so the user can be alerted (by email or SMS) of an event before it happens |
| todo myToDoItem | uses the one box to add an item to the |
| todo do my laundry | user's To Do list |

We claim:

1. A computer-implemented method for facilitating creation of a calendar event, the method comprising:
   providing a user interface for data entry comprising an area for data entry;
   receiving a string of non-structured data displayed in the area for data entry; and
   generating a calendar event entry by:
      searching the string of non-structured data for readily-identified data;
      responsive to identifying readily-identified data in the string of non-structured data, adding at least some of the readily-identified data to the calendar event entry and removing the readily-identified data from the string of non-structured data;
      parsing the remaining data in the string of non-structured data using natural language processing; and
      responsive to extracting information using natural language processing relevant to the calendar event entry, adding the extracted information to the calendar event entry.

2. The computer-implemented method of claim 1 further comprising:
   defining at least one set of readily-identifiable data, the at least one set of readily-identified data comprising at least one of the following:
      a set triggers, each trigger from the set of triggers being correlated to a specific action; and
      a set of syntax structures.

3. The computer-implemented method of claim 2 further comprising the step of:
   responsive to entry by the user into the area for data entry of a trigger, displaying a prompt correlated to the trigger that suggests data from the user; and
   responsive to the user providing additional data, updating the area for data entry to include the additional data.

4. The computer-implemented method of claim 1 wherein the area for data entry is part of an application that has a primarily function other than calendaring.

5. The computer-implemented method of claim 4 wherein the application is a messaging application.

6. A non-transitory computer-readable medium comprising one or more sequences of instructions which, when executed by one or more processors, causes the one or more processors to perform the method of claim 1.

7. A system comprising:
   a display for presenting information to a user;
   an input device for receiving input from the user;
   one or more processors, communicatively coupled to the display and the input device, that facilitates creation of a calendar event by causing steps to be performed comprising:
      providing a user interface for data entry comprising an area for data entry;
      receiving a string of non-structured data displayed in the area for data entry; and
      generating a calendar event entry by:

searching the string of non-structured data for readily-identified data;

responsive to identifying readily-identified data in the string of non-structured data, adding at least some of the readily-identified data to the calendar event entry and removing the readily-identified data from the string of non-structured data;

parsing the remaining data in the string of non-structured data using natural language processing; and responsive to extracting information using natural language processing relevant to the calendar event entry, adding the extracted information to the calendar event entry.

8. The system of claim 7 wherein at least one set of readily-identified data comprises at least one of the following:

a set triggers, each trigger from the set of triggers being correlated to a specific action; and a set of syntax structures.

9. The system of claim 8 further comprising the steps of:

responsive to entry by the user into the area for data entry of a trigger, displaying a prompt correlated to the trigger that suggests data from the user; and responsive to the user providing additional data, updating the area for data entry to include the additional data.

10. The system of claim 7 wherein the area for data entry is part of an application that has a primarily function other than calendaring.

11. The system of claim 10 wherein the application is a communications application.

12. A computer-implemented method for creating a calendar event, the method comprising:

receiving from a user a string of non-structured data comprising calendar event information; and generating a structured event data file by:

searching the string of non-structured data for readily-identified data;

responsive to identifying readily-identified data in the string of non-structured data related to a calendar event:

providing a prompt interface, via a display device, to the user that facilitates creating an entry into a calendar application of the calendar event;

responsive to the user affirmatively indicating to create the calendar event, adding at least some of the readily-identified data to the structured event data file;

parsing the remaining data in the string of non-structured data using natural language processing; and responsive to extracting information using natural language processing that is relevant to the entry, adding at least some of the extracted information to the structured event data file.

13. The computer-implemented method of claim 12 further comprising:

displaying to a user an interface comprising a single area for data entry that receives from the user the string of non-structured data.

14. The computer-implemented method of claim 13 wherein the single area for data entry is part of an application that has a primarily function that is not calendaring.

15. The computer-implemented method of claim 14 wherein the application is a communications application.

16. The computer-implemented method of claim 12 further comprising:

displaying to the user, via the display device, the calendar event.

17. The computer-implemented method of claim 12 further comprising:

allowing the user to edit one or more parameters related to the calendar event before entry into a calendar application.

18. The computer-implemented method of claim 12 further comprising:

providing the prompt interface from the user application that receives the string of non-structure data.

19. The computer-implemented method of claim 12 wherein the step of providing a prompt interface to the user comprises:

identifying to the user at least some of the readily-identified data in the string of non-structured data regarding the calendar event.

20. A non-transitory computer-readable medium comprising one or more sequences of instructions which, when executed by one or more processors, causes at least one of the one or more processors to perform the method of claim 12.

* * * * *